M. HOUDAILLE.
WIPING DEVICE FOR SCREENS AND THE LIKE.
APPLICATION FILED MAR. 24, 1913.
1,146,497.
Patented July 13, 1915.
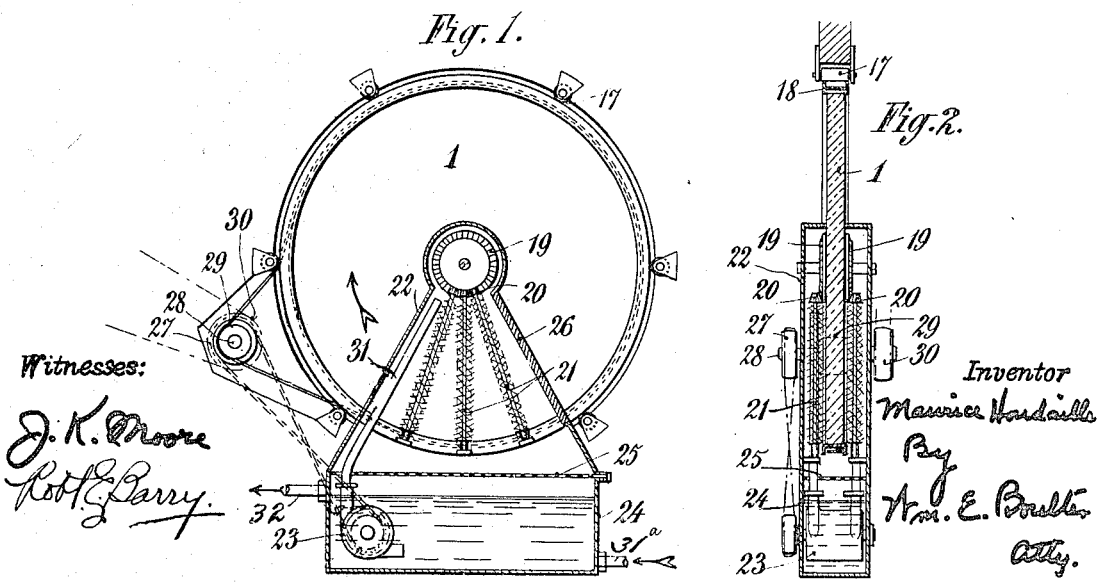

UNITED STATES PATENT OFFICE.

MAURICE HOUDAILLE, OF LEVALLOIS-PERRET, FRANCE.

WIPING DEVICE FOR SCREENS AND THE LIKE.

1,146,497.

Specification of Letters Patent.

Patented July 13, 1915.

Application filed March 24, 1913. Serial No. 756,570.

*To all whom it may concern:*

Be it known that I, MAURICE HOUDAILLE, a citizen of the French Republic, residing in Levallois-Perret, France, have invented a certain new and useful Wiping Device for Screens and the like, of which the following is a specification.

This invention relates to a device for wiping glass screens or the like, and according to the invention the screen is constituted by a revolving disk driving with a rapid rotary movement brushes arranged on both sides of the said disk.

The device is more particularly applicable to the windows of locomotives or other vehicles, and other surfaces liable to collect soot or other adhesive dust which cannot be removed by simple wiping, though it is not limited to these applications.

A construction according to the invention is shown in the accompanying drawing, in which—

Figure 1 is a vertical section in front elevation; and Fig. 2 is a section in side elevation.

The circumferential mount of the rotary glass 1 forms a flanged rim rotating on a series of rollers 17 and forming a pulley intended to receive a driving belt 18 operated by any suitable transmission gear. At each side of its center, the glass 1 is provided with a bevel wheel 19 with which engage a series of small bevel pinions 20 mounted respectively on radial rods 21 arranged in a triangular case 22. These rods have around each of them and along the whole of their length, vegetable or metal brush elements engaging with the two faces of the glass. Along one of the edges of each of the sides of the case 22, is arranged a perforated tube 31 terminating at the discharge branch of a centrifugal pump 23 immersed in a water tank 24 arranged below the case 22. The water contained in the said tank 24, is mixed with potash or any other detergent. A metal netting 25 is arranged in the tank 24 above the pump 23, between the latter and the case 22 containing the rotary brushes. The sides of the case 22 are provided with rubber scrapers 26 in contact with the two faces of the rotary glass 1.

The pump 23 is driven by a pulley 27 arranged on a counter shaft 28 driving also the rotary glass 1 by means of another pulley 29 and receiving its movement from the driving transmission by a pulley 30. In these conditions, when the glass 1 and the pump 23 are driven, water is projected through the tubes 31 against the two faces of the glass 1, while the wheels 19 driven by the glass 1, act on the pinions 20 in order to impart a rapid movement of rotation to the brushes which thus clean the glass. The movement of rotation is imparted to the glass so that the portions to be cleaned, come first under the brushes, so that soot and other impurities detached by the said brushes but remaining on the glass, are held back by the scrapers 26 and then fall on the metal netting 25. This netting is detachable so that it can be easily removed and cleaned.

The tank 24 can be fed with water either continuously or intermittently by means of a conduit 31ª terminating at the said tank. The excess of water escapes through the conduit 32.

What I claim as my invention and desire to secure by Letters Patent is:—

1. In a device for wiping glasses, transparent screens and the like, a rotary glass disposed in an opening made in a fixed glass, driving means acting on the circumference of the glass, rotary cleaning brushes applied to both faces of the glass, driving means for said brushes, a case surrounding said brushes, a water tank forming the lower portion of the case, means driven by the mechanism which drives the glass for impinging water upon the glass, and a netting arranged in the upper portion of the tank for separating dirt and water coming from the cleaning brushes.

2. In a device for wiping glasses, transparent screens and the like, a rotary glass disposed in an opening made in a fixed glass, driving means acting on the circumference of the glass, rotary cleaning brushes applied to both faces of the glass, driving means for said brushes, a case surrounding said brushes, a water tank forming the lower portion of the case, means driven by the mechanism which drives the glass for impinging water upon the glass, rubber scrapers fixed to the case and engaging the glass at both sides, and a netting arranged in the upper portion of the tank for separating dirt and water coming from the cleaning brushes.

3. In a device for wiping glasses, transparent screens and the like, a rotary glass disposed in an opening made in a fixed glass, rollers inserted between the fixed glass and the rotary glass, a ring in which the glass is set, a grooved pulley formed with the ring, a driving pulley supported in a recess of the fixed glass, a driving belt passing over the pulley and the grooved pulley of the movable glass, rotary cleaning brushes applied to both faces of the glass, bevel pinions secured to the said brushes, a central spindle for the glass, bevel wheels secured to the central spindle and engaging with the pinions of the said brushes, a case surrounding the bevel wheels and also the brushes, a water tank forming the lower portion of the case, a pump arranged in the said tank and driven from the driving pulley, perforated conduits projecting the water discharged by the pump against the two faces of the glass, and a netting arranged in the upper portion of the tank for separating dirt and water coming from the cleaning brushes.

In testimony whereof I have signed my name to this specification in the presence of two subscribing witnesses.

MAURICE HOUDAILLE.

Witnesses:
GEORGES BONNEIUL,
LUCIEN MEMMINGER.